United States Patent
De et al.

(10) Patent No.: US 9,569,234 B2
(45) Date of Patent: Feb. 14, 2017

(54) DYNAMIC BIT-WIDTH MODIFICATION OF INTERNAL POINTERS OF A VIRTUAL MACHINE

(71) Applicant: Qualcomm Innovation Center, Inc., San Diego, CA (US)

(72) Inventors: Subrato K. De, San Diego, CA (US); Derek J. Conrod, San Diego, CA (US); Dineel D. Sule, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 93 days.

(21) Appl. No.: 14/524,219

(22) Filed: Oct. 27, 2014

(65) Prior Publication Data

US 2016/0117182 A1    Apr. 28, 2016

(51) Int. Cl.
*G06F 9/455* (2006.01)
*G06F 9/45* (2006.01)

(52) U.S. Cl.
CPC .............. *G06F 9/4552* (2013.01); *G06F 8/443* (2013.01); *G06F 9/45516* (2013.01)

(58) Field of Classification Search
None
See application file for complete search history.

(56) References Cited

U.S. PATENT DOCUMENTS

| | | | | |
|---|---|---|---|---|
| 6,049,667 A * | 4/2000 | Bates | ............ | G06F 8/447 717/138 |
| 7,133,993 B1 * | 11/2006 | Jackson | ............ | G06F 8/4434 711/170 |
| 7,685,588 B2 * | 3/2010 | Zheltov | ............ | G06F 11/3644 717/158 |
| 7,926,043 B2 * | 4/2011 | Vaswani | ............ | G06F 11/3466 717/130 |
| 8,407,681 B2 * | 3/2013 | Slattery | ............ | G06F 9/45516 717/141 |
| 8,510,596 B1 * | 8/2013 | Gupta | ............ | G06F 11/073 714/15 |
| 2008/0034350 A1 * | 2/2008 | Conti | ............ | G06F 21/54 717/124 |

(Continued)

OTHER PUBLICATIONS

Guo, Zhi, et al. "Optimized generation of data-path from C codes for FPGAs." Proceedings of the conference on Design, Automation and Test in Europe—vol. 1. IEEE Computer Society, 2005.Retrieved on [Sep. 28, 2016] Retrieved from the Internet:URL<http://dl.acm.org/citation.cfm?id=1049084>.*

Hoshino, Hiroki et al "Advanced Optimization and Design Issues of a 32-bit Embedded Processor Based on Produced Order Queue Computation Model." Embedded and Ubiquitous Computing, 2008. Retrieved on [Sep. 28, 2016] Retrieved from the Internet:URL<http://ieeexplore.ieee.org/document/4756315/?arnumber=4756315>.*

*Primary Examiner* — Thuy Dao
*Assistant Examiner* — Cheneca Smith
(74) *Attorney, Agent, or Firm* — Neugeboren O'Dowd PC

(57) ABSTRACT

A content processing device and corresponding method for processing source code are disclosed. The method may include receiving source code with a virtual machine operating on a hardware platform with an inherent address-pointer-bit-width and generating, from the source code, executable code that includes internal address pointers to objects in the virtual machine heap. One or more runtime conditions may be monitored and a size of a bit-width for the internal address pointers in the virtual machine may be adjusted, with or without associated changes to create optimized layout of the objects in the virtual machine heap, based upon one or more runtime conditions.

17 Claims, 6 Drawing Sheets

(56) References Cited

U.S. PATENT DOCUMENTS

| | | | |
|---|---|---|---|
| 2009/0293050 A1* | 11/2009 | Slattery | G06F 9/45516 717/158 |
| 2011/0258616 A1* | 10/2011 | Sollich | G06F 9/44 717/146 |
| 2011/0314452 A1* | 12/2011 | Tillmann | G06F 9/45516 717/128 |
| 2013/0091337 A1* | 4/2013 | Schmich | G06F 11/3636 711/171 |
| 2014/0189657 A1* | 7/2014 | Guarnieri | G06F 11/3604 717/133 |

* cited by examiner

```
ldr r0, [fp, #+12]
tst r0, #1
movk Xr, off-0, #imm1
bxeq Xr
ldr r9, [r0, #-1]
movk Xs, off-0, #imm5
movk Xs, off-16, #imm6
cmp r9, Xs
ldr X1, [Xa, #+1008]
Insert Xt, X1, width-48,offset-0
bxne Xt
......
.......
// Constant Pool
48-bit VMinterPoint-D
.......
```

FIG. 3

Object layout

- Map (32-bit pointer)
- A (32-bit pointer)
- B (64-bit pointer)

Map property descriptors

- A: 32-bit pointer, offset 4
- B: 64-bit pointer, offset 8

```
;; load map pointer
ldr.32 x1, [xa, #0]
;; check map
movk x2, off-0, #1mm16
movk x2, off-16, #1mm16
cmp x1, x2
bne check_failed
;; load 32-bit address
ldr.32 x3, [xa, #4]
;; load 64-bit address
ldr.64 x4, [xa, #8]
```

FIG. 5

DYNAMIC BIT-WIDTH MODIFICATION OF INTERNAL POINTERS OF A VIRTUAL MACHINE

BACKGROUND

Field

The present invention relates to computing devices. In particular, but not by way of limitation, the present invention relates to compiling or interpreting scripting code.

Background

More and more websites are utilizing source code constructs that are written in high level programming languages that must be compiled or interpreted before many other activities (e.g., layout calculations, rendering,) associated with the constructs can be executed. By way of example, ECMAscript-based scripting languages (e.g., JavaScript or Flash) are frequently used in connection with the content that they host. More specifically, JavaScript-based content is ubiquitous, and JavaScripts are run by a JavaScript engine that may be realized by a variety of technologies including interpretation-type engines, HotSpot just-in-time (JIT) compilation (e.g., trace based or function based), and traditional-function-based JIT compilation where native code is generated for the entire body of all the functions that get executed.

A large amount of data in a virtual machine (e.g., a JavaScript engine or engine associated with another dynamic language) includes pointers (e.g., pointers to objects, maps, etc, in the virtual machine heap), and the size of the pointers will be increasing as new hardware is developed. For example, pointer sizes will be increasing from 32-bits to 64-bits as hardware moves from 32-bit architectures to 64-bit architectures. As a consequence, there will be a substantial increase in the size of data/object heaps, which may potentially place undesirable pressure on memory resources.

SUMMARY

Aspects of the present disclosure may be characterized as a method for processing source code. The method may include receiving source code with a virtual machine operating on a hardware platform that has a maximum inherent address-pointer-bit-width and generating executable code from the source code that includes internal address pointers to objects in a virtual machine heap. The executable code is executed on the hardware platform, and one or more runtime conditions are monitored in connection with the execution of the executable code. A size of a bit-width for the internal address pointers is then adjusted based upon the one or more runtime conditions.

Another aspect may be characterized as a non-transitory, tangible computer readable storage medium, encoded with processor readable instructions to perform a method for processing source code. The method may include receiving source code with a virtual machine operating on a hardware platform that has a maximum inherent address-pointer-bit-width, generating executable code from the source code that includes internal address pointers to objects in a virtual machine heap, and executing the executable code on the hardware platform. One or more runtime conditions are monitored in connection with the execution of the executable code, and a size of a bit-width for the internal address pointers is adjusted based on the one or more runtime conditions.

Yet another aspect may be characterized as a computing device comprising a network interface that receives source code from a remote location, a hardware platform that is coupled to the network interface that includes a maximum inherent address-pointer-bit-width, and a virtual machine that generates executable code from the source code. The executable code includes internal address pointers to objects in a virtual machine heap, and the virtual heap includes an execution component that executes the executable code on the hardware platform. The virtual heap also includes a runtime condition monitor that monitors one or more runtime conditions in connection with the execution of the executable code, and a pointer-size selection component that adjusts a size of a bit-width for the internal address pointers based upon the one or more runtime conditions.

BRIEF DESCRIPTION OF THE DRAWINGS

FIG. 3, a diagram depicting is an example of instructions that may be generated by the optimizing compiler depicted in FIG. 1;

FIG. 5 depicts the storing and loading of pointers of various sizes in objects and storing meta-data describing the representation of each object property.

DETAILED DESCRIPTION

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

The word "exemplary" is used herein to mean "serving as an example, instance, or illustration." Any embodiment described herein as "exemplary" is not necessarily to be construed as preferred or advantageous over other embodiments.

Figure 1:
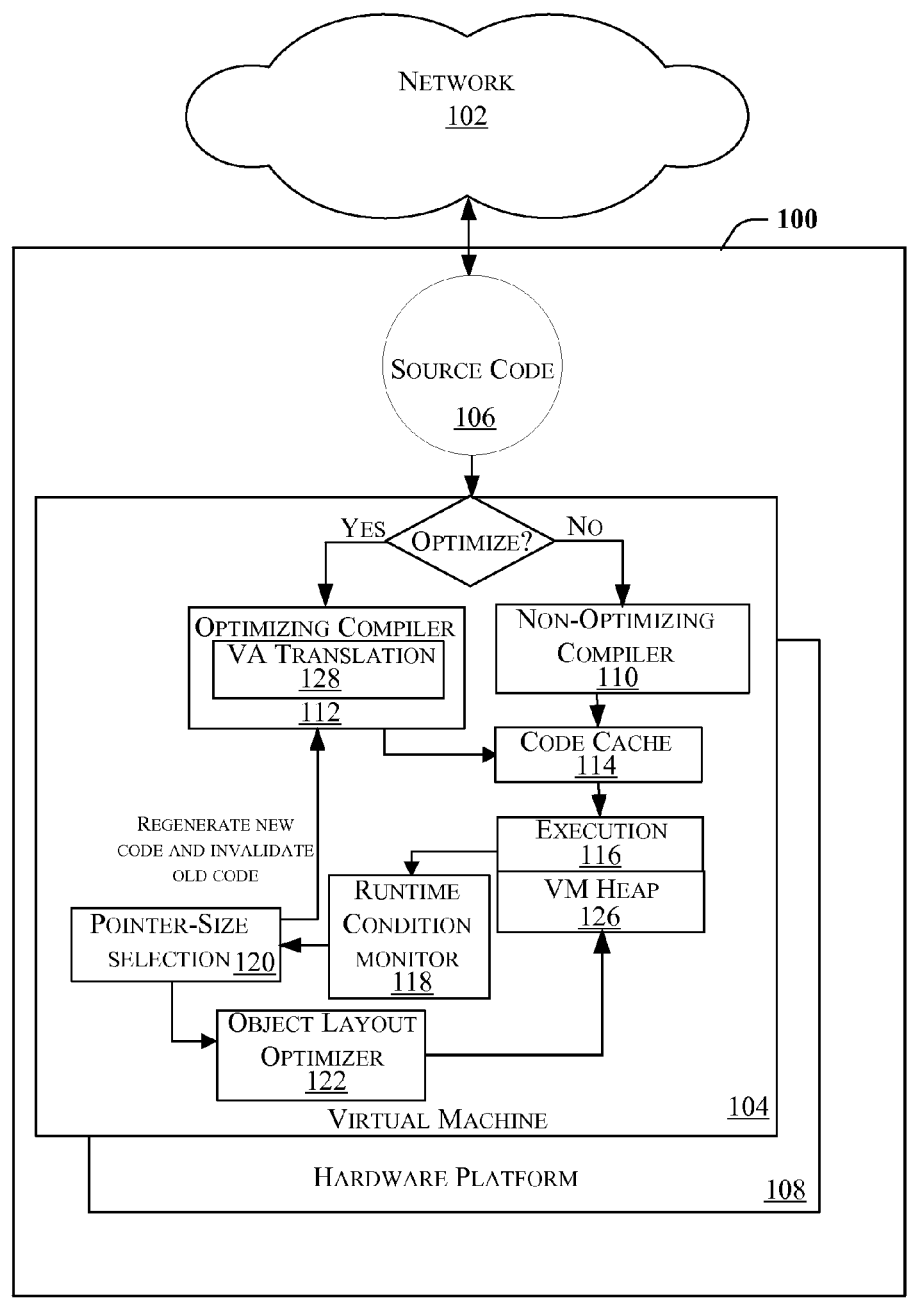
FIG. 1 is a block diagram of an exemplary communication device.

Referring to FIG. 1, shown is a block diagram depicting a communication device 100 in which many embodiments of the present invention may be implemented. As shown, the communication device 100 is generally configured to communicate via a network 102 to remote web servers or proxy servers (not shown) to receive and display content (e.g., webpages) for a user of the communication device 100. The communication device 100 may be realized by a wireless communications device (WCD) such as a smartphone, PDA, netbook, tablet, laptop computer and other wireless devices. But the communication device 100 may work in tandem with wireline and wireless communication devices. The network 102 may include the Internet, local area networks, cellular networks (e.g., CDMA, GPRS, and UMTS networks), WiFi networks, and other types of communication networks.

As depicted, the communication device 100 in this embodiment includes a virtual machine 104 that is disposed to receive and process source code 106 so the internal address pointers utilized by the virtual machine 104 occupy less memory than they would if the stored internal address pointers had the same fixed bit-width that is utilized by the hardware platform 108. More specifically, the virtual machine 104 may exploit multiple different bit-width sizes (e.g., 16-bits, 32-bit, 48-bit, 64-bits, etc.) for internal address pointers, and the particular pointer size that is used may be dynamically determined based on different runtime conditions for different parts of the compiled code.

For purposes of example only, the virtual machine 104 is assumed throughout this disclosure to be a JIT-based JavaScript engine that generates just-in-time (JIT) compiled code (referred to herein as "JITed" code), but this is certainly not required, and the virtual machine 104 may operate in connection with a variety of different dynamically typed languages including ECMAscript-based scripting languages, LISP, SELF, Python, Perl, and ActionScript.

As shown, in this embodiment the virtual machine 104 operates on a hardware platform 108 that operates with a maximum inherent address-pointer-bit-width. For example, the hardware platform 108 may be realized by a 64-bit architecture such as ARMv8 ISA architecture that has a maximum inherent 64-bit address-pointer-bit-width, but this only one example of the types of architectures that the hardware platform 108 may utilize.

As shown, the virtual machine 104 in this embodiment includes a non-optimizing compiler 110 and an optimizing compiler 112 that are both coupled to a code cache 114 that is in communication with an execution component 116, which is coupled to a runtime condition monitor 118. As depicted, a pointer-size selection component 120 is in communication with the optimizing compiler 112, the runtime condition monitor 118, and an object layout optimizer 122. In addition, the object layout optimizer 122 is in communication with a virtual machine heap 126, which is coupled to the execution component 116.

The illustrated arrangement of the components depicted in FIG. 1 is logical, the connections between the various components are exemplary only, and the depiction of this embodiment is not meant to be an actual hardware diagram; thus, the components can be combined or further separated in an actual implementation, and the components can be connected in a variety of ways without changing the basic operation of the system.

In general, the depicted virtual machine 104 operates to generate executable code that utilizes, when possible, internal address pointers that are smaller in size than the inherent address-pointer-bit-width of the hardware platform 108. As discussed above, a large amount of data in the virtual machine 104 is address pointers (e.g., pointers to Objects, Maps, etc, in the virtual machine heap), and when the address pointer size in the hardware CPU increases from 32 bits to 64 bits, there is a large increase in the size of memory occupied by the virtual machine heap 126 if the internal address pointers in the virtual machine are maintained exactly the same size as the size of the address pointers in the hardware CPU. The internal address pointer values can be maintained as a pool of constants in memory, called the "Constant Pool" in this disclosure. On some occasions for example, when instead of using the "ConstantPool," the address pointer value is rematerialized within the assembly instruction stream, (e.g., by a MOVW/MOVT instruction pair for 32-bit pointers in the ARMv7 ISA), moving from 32-bit pointers to 64-bit pointers necessitates the use of 4 MOVK assembly instructions to rematerialize the 64-bit address value within the JITed assembly code stream.

If the virtual machine 104 is realized by a V8 JavaScript JIT for example, the virtual machine 104 makes extensive use of internal address pointers. A common code sequence includes:

"LD x; LD y; CMP x,y; B<cond>;" 'x' and 'y' are addresses ('x' in Constant pool, 'y' is input)
"MOVW/MOVT x; LD y; CMP x,y; B<cond>" 'x' is address literal, 'y' is input addresses.

Approximately 20% of the instructions in the JITed assembly code sequence (as an example in V8 JavaScript JIT) are load instructions, which loads values from the Constant pool, or a combination of MOVW/MOVT instruction for the ARM hardware CPU. And moving from a 32-bit pointer to 64-bit pointer doubles the size of the Constant pool (load on D-cache), or requires that 4 MOVK instructions be used to recreate 64-bit internal address pointer's value. Although the virtual machine 104 in some modes may accommodate internal address pointers up to the size of the inherent address-pointer-bit-width of the hardware platform 108, in general, the virtual machine 104 can use internal address pointers that are smaller in size than the inherent address-pointer-bit-width of the hardware platform 108, which reduces the Constant Pool size, and/or enables the address literal to be rematerialized using Movw/Movt or a limited number of MOVK instructions, thereby reducing D-cache and/or I-cache pressure. In addition, when a fewer number of instructions (e.g., MOVKs) are used, it is anticipated that the speed of pointer processing may be increased.

Moreover, the reduced size of internal address pointers means that in-memory objects that contain pointers may be significantly smaller than they would be if the virtual machine 104 utilized fixed internal address pointers that are the same size as the inherent address-pointer-bit-width of the hardware platform 108. For example, an object containing only 32-bit pointers will be half the size of an object containing only 64-bit pointers. But as disclosed further herein, the addressability range of the internal pointers may be scaled up as needed to use the full size of the inherent address-pointer-bit-width of the hardware platform 108 for certain parts of the compiled code.

Yet another advantage of the depicted virtual machine 104 is the ability to pack pointer processing for multiple smaller bit-width pointers simultaneously into a higher bit-width processing operation (e.g., two 32-bit pointers can be processed by a single 2-element 64-bit SIMD operation), thereby speeding up execution. The smaller pointer bit-width enhances the opportunity to further optimize the optimization techniques disclosed in the commonly owned U.S. Pat. No. 8,539,463 entitled "Apparatus and method for improving the performance of compilers and interpreters of high level programming languages," which is incorporated herein in its entirety.

Figure 2:
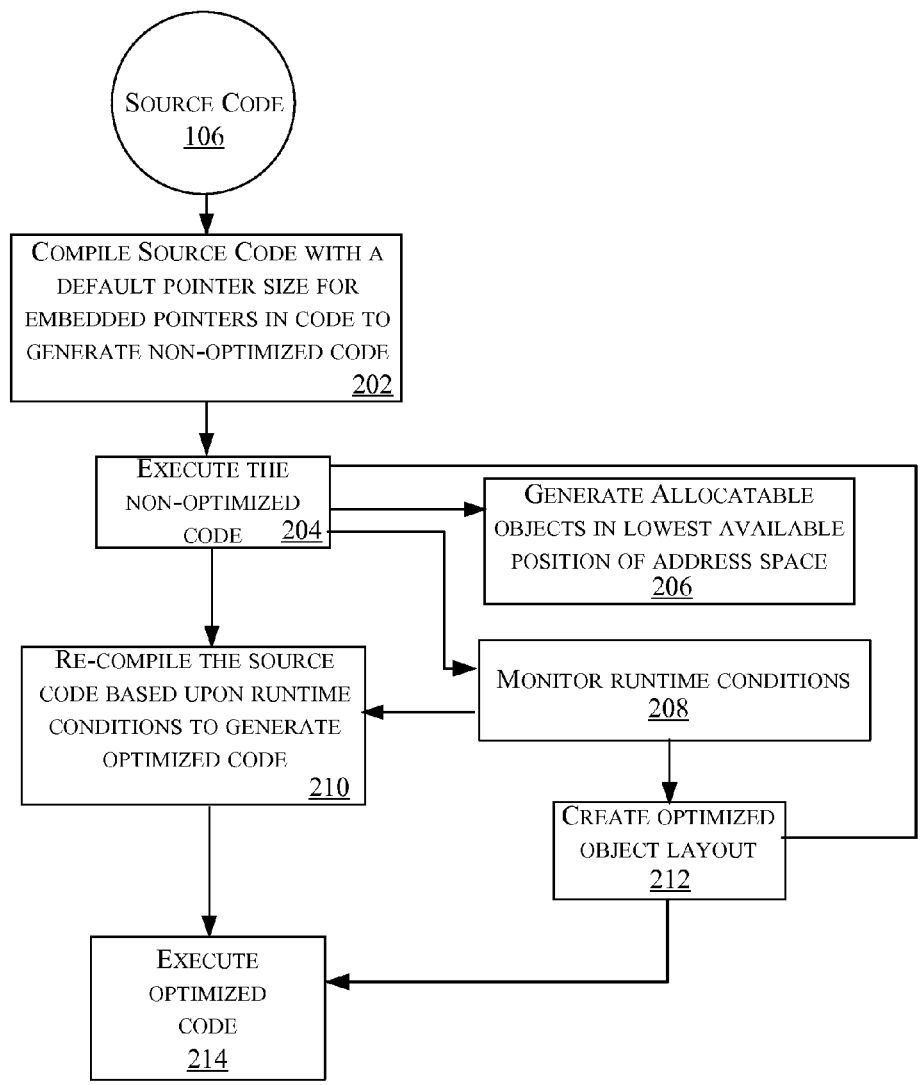
FIG. 2 is a flowchart depicting an exemplary method.

While referring to FIG. 1, simultaneous reference is made to FIG. 2, which is a flowchart depicting a method that may be carried out in connection with the embodiment depicted in FIG. 1. As shown, initially the non-optimizing compiler 110 receives the source code 106 and compiles the source code with a default pointer size for embedded internal address pointers in the code to generate non-optimized code (Block 202). For example, the default pointer size for the embedded internal address pointers may be set to the maximum inherent address-pointer-bit-width of the hardware platform 108, but this is not required, and the default pointer size may be set to other bit widths that are less than the maximum inherent address-pointer-bit-width of the hardware platform 108. The non-optimized code is then executed from the code cache 114 by the execution component 116 (Block 204). As depicted, the execution component 116 generates allocatable objects in the lowest available position of the address space (Block 206), and the runtime condition monitor 118 monitors runtime conditions while the code is executed (Block 208). The runtime conditions may include an address range of the executable code, and the runtime condition monitor 118 may also monitor other instances of virtual machines (e.g., the virtual machine 104) that share the same memory resource so that if memory pressure is prone to reduce the availability of memory and affect execution of the executable code, the addressable range of the virtual machine's 104 internal address pointers may be increased up to the number of address bits that the hardware's memory addressing mechanism inherently supports.

More specifically, the pointer-size selection component 120 receives feedback from the runtime condition monitor 118, and prompts the optimizing compiler 112 to re-compile the source code 106—potentially using one or more different bit-widths for the internal address pointers than the default bit-width—based upon the runtime conditions to generate optimized code (Block 210). In this way, the size of the bit-width of the internal address pointers may be adjusted based upon the runtime conditions.

For example, the default bit-width of the internal address pointers may be set to a value that is less than the maximum inherent address-pointer-bit-width of the hardware platform 108, and in these instances, the size of the of the bit-width of the internal address pointers may be adjusted to be larger or smaller than the default bit-width. Moreover, the adjusted bit-width of the internal address pointers may remain less than the maximum inherent address-pointer-bit-width of the hardware platform 108. But in other instances (e.g., where the default bit-width of the internal address pointers is equal to the maximum inherent address-pointer-bit-width of the hardware platform 108), the adjusted size may be a bit size that is less than or equal to the maximum inherent address-pointer-bit-width.

As shown in FIG. 2, the object layout optimizer 122 creates an optimized object layout (Block 212), and the optimized code is executed using the optimized objects with the new layout (Block 214). The process depicted in FIG. 2 may be iteratively effectuated on an ongoing basis, and the bit-width of the internal address pointers may be scaled up at most to the maximum inherent address-pointer-bit-width of the hardware platform 108, or down based upon the runtime conditions.

As shown, the optimizing compiler 112 includes a virtual address translation component 128 that adapts the generated executable code so that the different sized internal address pointers (e.g., 16-bit, 32-bit, and 48-bit) may be dynamically converted to the maximum inherent address-pointer-bit-width of the hardware platform 108 (e.g., 64-bits) so that the optimized executable code may be executed by the hardware platform 108.

In one embodiment, the internal address pointers are dynamically converted to the maximum inherent address-pointer-bit-width of the hardware platform 108 using general purpose registers acting as segment registers. Referring to FIG. 3, for example, shown is an example of instructions that may be generated by the optimizing compiler 112 including instructions generated by the virtual address translation component 128. In this example, the inherent address-pointer-bit-width of the hardware platform is 64-bits, and Xr, Xs, and Xt are dedicated general purpose registers that are reserved by the virtual machine as internal segment registers to acts as address registers and hold the upper bits for the hardware platform's virtual address. More specifically, Xr is holding the upper 48-bits of the virtual address, with the lower 16-bits coming from the internal virtual machine 104 pointer; Xs is holding the upper 32-bits of the virtual address, with the lower 32-bits coming from the internal virtual machine 104 pointer; and Xt is holding the upper 16-bits of the virtual address, with the lower 48-bits coming from the internal virtual machine 104 pointer.

If the internal address pointers are using the full inherent address-pointer-bit-width (64-bits), no change is required from existing methods. The dynamic information gathered by the runtime condition monitor 118 is utilized by the pointer-size selection component 120 to determine the size of the internal pointer address that is used at different points in the compiled code (e.g., JITed code). The virtual address translation component 128 tracks the particular sized internal address pointer used at each particular location in the compiled code (e.g., JITed assembly code) and is used for proper updating of the internal address pointers during a self-modification It should be noted that this example shows instructions in ARMv8 (AARch64), and there may be trade-off for using "MOVKs inserting VM pointer values into VM reserved segment registers" as opposed to "ConstantPool-loads of 32-bit VM internal pointer followed by a bit field-insert into the VM reserved segment registers." But other architectures may be more efficient as they may not require the insert operation for address pointers because the loads from constant pool may write to the lower sub-part of the 64-bit reserved general purpose registers used as the internal segment registers.

Figure 4:
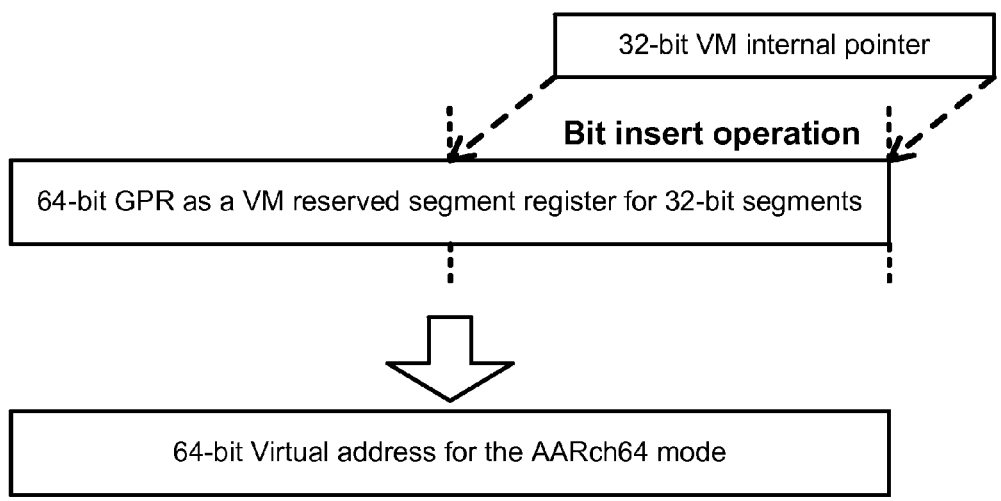
FIG. 4 is a drawing depicting how the virtual address of the hardware platform may be created.

Referring next to FIG. 4, it is a drawing depicting how the virtual address of the hardware platform 108 (with the inherent address-pointer-bit-width) may be created from the reserved segment registers and the internal pointer address of the virtual machine 104. As depicted, the virtual address for the hardware platform 108 may be created by bitwise-inserting the contents of the internal address pointer on the lower bits (e.g., the lower 32-bits for a 32-bit internal address pointer) of the particular reserved segment pointers, which in this example are all 64-bit general purpose registers wherein higher bits form the segment base.

Multiple segment registers may be utilized for the different segment sizes, which are determined by the internal address pointer sizes utilized by the virtual machine 104 (e.g., 16-bits, 32-bits, 48-bits and 64-bits) and the segment registers can be initialized when the virtual machine 104 is initialized or re-initialized anywhere in the compiled code (e.g., JITed code) sequence or by the memory management code of the virtual machine. A particular access can have the same internal address pointer value, but its segment base can change, enabling easy updating to access a relocated object. Beneficially, this enables a lightweight update of the JITed code sequence accessing live objects after garbage collection. The virtual machine 104 may maintain multiple segment values in the virtual machine heap 126, whereby at different points in the execution stream, the virtual machine 104 may load the required segment base value into the reserved general purpose registers that are used as segment registers.

Referring next to FIG. 5, depicted is the storing and loading of pointers of various sizes in objects in the virtual machine heap and storing meta-data information describing each object property or fields. In this disclosure we use the term "map" to an object that contains meta-data describing the structure of other objects. Every object (except for maps) has a pointer to its map, and multiple objects with the same structure may point to the same map. The meta-data of a map includes a list of descriptors that describe all of the properties in an object. Each descriptor contains the name, representation, and offset of a property. Pointer properties (object fields that are internal address pointers to other objects virtual machine heap) may have different representations (e.g., number of bits like 16-bit, 32-bit, 48-bit, 64-bit, etc). Optimized code may contain specialized instructions to load or store properties with known representations. In order to confirm the specialized code is safe to execute, optimized code may perform a run-time check to confirm that an object has a known layout as described by its map. If the run-time check fails, execution may jump to un-optimized code. Map pointers may have a fixed offset (e.g., always at the beginning of an object) and a fixed representation (e.g., always 32-bits), so that optimized code may access maps without additional checks.

Figure 6:
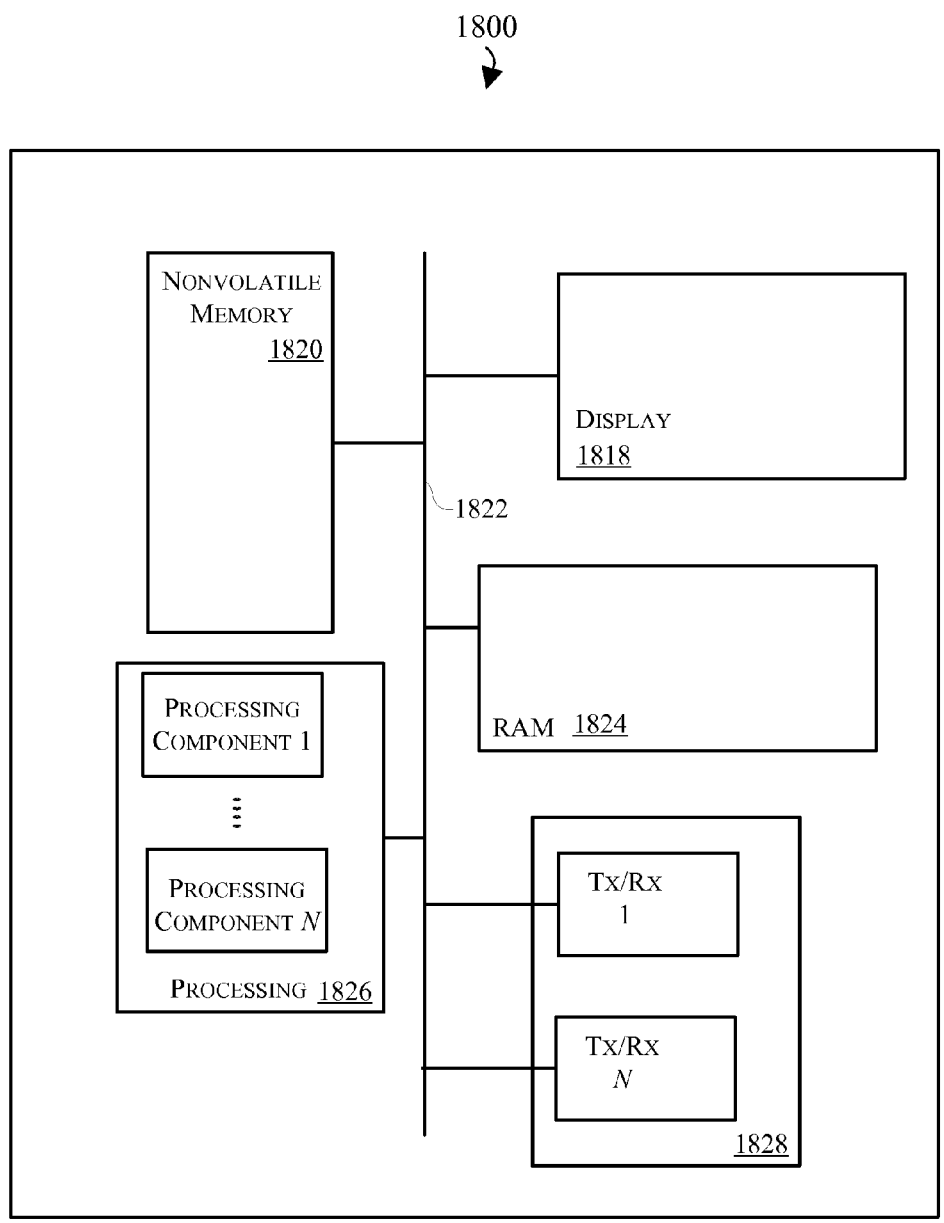
FIG. 6 is a block diagram depicting physical components of an exemplary communication device that may be utilized to realize the communication device described with reference to FIG. 1.

Referring next to FIG. 6, shown is a block diagram depicting physical components of an exemplary communication device 1800 that may be utilized to realize the communication device 100 (and portions of the hardware platform 108) described with reference to FIG. 1. As shown, the communication device 1800 in this embodiment includes a display 1818, and nonvolatile memory 1820 that are coupled to a bus 1822 that is also coupled to random access memory ("RAM") 1824, N processing components 1826, and a transceiver component 1828 that includes N transceivers. Although the components depicted in FIG. 6 represent physical components, many of the components depicted in FIG. 6 may be realized by common constructs or distributed among additional physical components. Moreover, it is certainly contemplated that other existing and yet-to-be developed physical components and architectures may be utilized to implement the functional components described with reference to FIG. 6.

The display 1812 generally operates to provide a presentation of content to a user, and may be realized by any of a variety of displays (e.g., CRT, LCD, HDMI, micro-projector and OLED displays). And in general, the nonvolatile memory 1820 functions to store (e.g., persistently store) data and executable code including code that is associated with the functional components depicted in FIG. 1. In some embodiments for example, the nonvolatile memory 1820 includes bootloader code, modem software, operating system code, file system code, and code to facilitate the implementation of one or more portions of components of the virtual machine 104 depicted in FIG. 1.

In many implementations, the nonvolatile memory 1820 is realized by flash memory (e.g., NAND or ONENAND memory), but it is certainly contemplated that other memory types may be utilized as well. Although it may be possible to execute the code from the nonvolatile memory 1820, the executable code in the nonvolatile memory 1820 is typically loaded into RAM 1824 and executed by one or more of the N processing components 1826.

The N processing components 1826 in connection with RAM 1824 generally operate to execute the instructions stored in nonvolatile memory 1820 to effectuate the functional components depicted in FIG. 1. For example, a code cache of the compiler/interpreter 114 may reside in RAM 1824 and compiled code may be executed by one or more of the N processing components 1826. As one of ordinarily skill in the art will appreciate, the N processing components 1826 may include an application processor, a video processor, modem processor, DSP, graphics processing unit (GPU), and other processing components.

The transceiver component 1828 includes N transceiver chains, which may be used for communicating with the network 102 described with reference to FIG. 1. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware or hardware in connection with software The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing source code comprising:
   receiving source code with a virtual machine operating on a hardware platform that has a maximum inherent address-pointer-bit-width;
   generating non-optimized executable code from the source code;

creating, using meta-data information of different fields and bit-width sizes for internal pointer fields in map objects, an optimized object layout for different objects in a virtual machine heap;

generating optimized code that utilizes the optimized object layout as described by the map objects to access object properties in less time or with fewer instructions than the non-optimized executable code, the optimized code including run-time checks to confirm that an object has a known layout as described by the map objects, the optimized code including internal address pointers to objects in the virtual machine heap;

executing the optimized code on the hardware platform utilizing the optimized object layout;

monitoring one or more runtime conditions in connection with execution of the optimized code; and adjusting a size of a bit-width for the internal address pointers based upon the one or more runtime conditions.

2. The method of claim 1, wherein generating optimized code includes:

generating non-optimized executable code with internal address pointers that have a default bit-width;

wherein adjusting the size of the bit-width of the internal address pointers includes generating optimized code with internal address pointers that have an adjusted size that is larger or smaller than the default bit-width, but smaller than the maximum inherent address-pointer-bit-width.

3. The method of claim 1, wherein generating optimized code includes: generating non-optimized executable code with internal address pointers that have a default bit-width;

wherein the default bit-width is the maximum inherent address-pointer-bit-width and the adjusted size is a bit size that is less than or equal to the maximum inherent address-pointer-bit-width.

4. The method of claim 3, wherein the maximum inherent address-pointer-bit-width is 64 bits and the adjusted size is one of 16 bits, 32 bits, 48 bits, or 64 bits.

5. The method of claim 4, wherein monitoring includes monitoring an availability of memory on the hardware platform.

6. The method of claim 1, wherein monitoring includes: monitoring an address range of the optimized code.

7. The method of claim 1, including: dedicating general purpose registers on the hardware platform to store the internal address pointers; and updating the stored address pointers by bitwise-inserting each address pointer in lower bits of a corresponding general purpose register used as an address register.

8. A non-transitory, tangible computer readable storage medium, encoded with processor readable instructions to perform a method for processing source code, the method comprising:

receiving source code with a virtual machine operating on a hardware platform that has a maximum inherent address-pointer-bit-width;

generating non-optimized executable code from the source code;

creating, using meta-data information of different fields and bit-width sizes for internal pointer fields in map objects, an optimized object layout for different objects in a virtual machine heap;

generating optimized code that utilizes the optimized object layout as described by the map objects to access object properties in less time or with fewer instructions than the non-optimized executable code, the optimized code including run-time checks to confirm that an object has a known layout as described by the map objects, the optimized code including internal address pointers to objects in the virtual machine heap;

executing the optimized code on the hardware platform;

monitoring one or more runtime conditions in connection with execution of the optimized code; and adjusting a size of a bit-width for the internal address pointers based upon the one or more runtime conditions.

9. The non-transitory, tangible computer readable storage medium of claim 8, wherein generating optimized code includes:

generating non-optimized executable code with internal address pointers that have a default bit-width;

wherein adjusting the size of the bit-width of the internal address pointers includes generating optimized code with internal address pointers that have an adjusted size that is larger or smaller than the default bit-width, but smaller than the maximum inherent address-pointer-bit-width.

10. The non-transitory, tangible computer readable storage medium of claim 8, wherein generating optimized code includes:

generating non-optimized executable code with internal address pointers that have a default bit-width;

wherein the default bit-width is the maximum inherent address-pointer-bit-width and the adjusted size is a bit size that is less than or equal to the maximum inherent address-pointer-bit-width.

11. The non-transitory, tangible computer readable storage medium of claim 10, wherein the maximum inherent address-pointer-bit-width is 64 bits and the adjusted size is one of 16 bits, 32 bits, 48 bits, or 64 bits.

12. The non-transitory, tangible computer readable storage medium of claim 11, wherein monitoring includes monitoring an availability of memory on the hardware platform.

13. The non-transitory, tangible computer readable storage medium of claim 8, wherein monitoring includes: monitoring an address range of the optimized code.

14. The non-transitory, tangible computer readable storage medium of claim 8, wherein the method includes:

dedicating general purpose registers on the hardware platform to store the internal address pointers; and updating the stored address pointers by bitwise-inserting each address pointer in lower bits of a corresponding general purpose register.

15. A computing device comprising:

a network interface that receives source code from a remote location;

a hardware platform that is coupled to the network interface, the hardware platform including a maximum inherent address-pointer-bit-width;

a virtual machine that generates non-optimized executable code and optimized code from the source code, the optimized code including internal address pointers to objects in a virtual machine heap, the virtual machine including:

an object layout optimizer that generates, using meta-data information of different fields and bit-width sizes for internal pointer fields in map objects, an optimized object layout for different objects in the virtual machine heap, the optimized code including run-time checks to confirm that an object has a known layout as described by the map objects;

an optimizing compiler that utilizes the optimized object layout as described by the map objects to access object properties in less time or with fewer instructions than the non-optimized executable code;

an execution component that executes the optimized code on the hardware platform utilizing the optimized object layout;

a runtime condition monitor that monitors one or more runtime conditions in connection with execution of the optimized code; and a pointer-size selection component that adjusts a size of a bit-width for the internal address pointers based upon the one or more runtime conditions.

16. The computing device of claim 15, wherein the virtual machine includes:

a non-optimizing compiler that generates non-optimized executable code with internal address pointers that have a default bit-width;

wherein the optimizing compiler generates optimized code with internal address pointers that have an adjusted size that is less than or equal to the default bit-width of the internal address pointers.

17. The computing device of claim 16, wherein the default bit-width of the internal address pointers is the maximum inherent address-pointer-bit-width and the adjusted size is a bit size that is less than or equal to the maximum inherent address-pointer-bit-width of the hardware platform.

* * * * *